Nov. 1, 1927.
W. FERRIS
HYDRAULIC TRANSMISSION
1,647,690
Original Filed Oct. 26, 1922    6 Sheets-Sheet 3
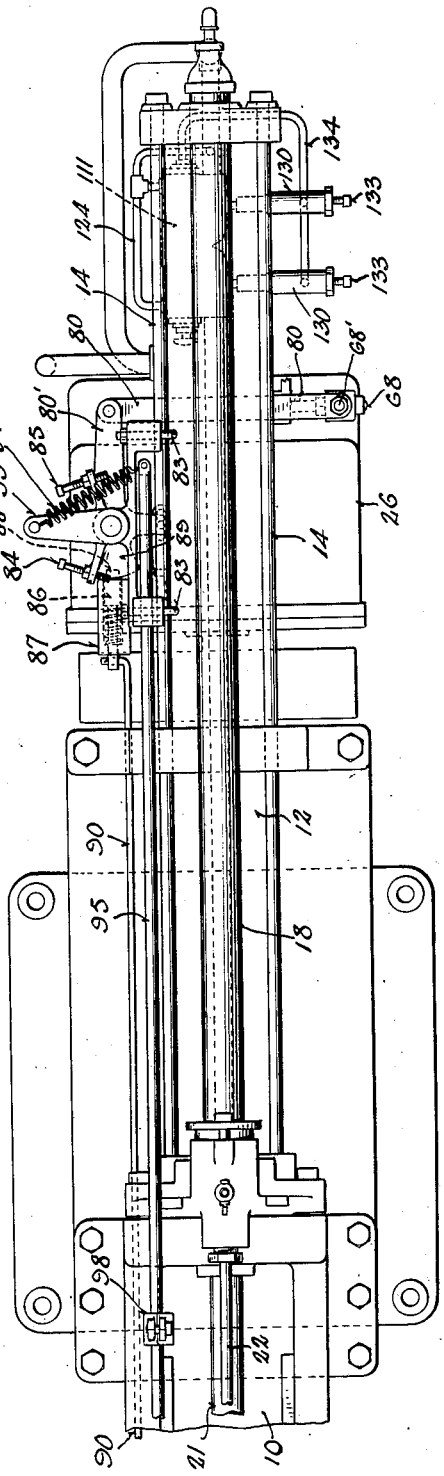
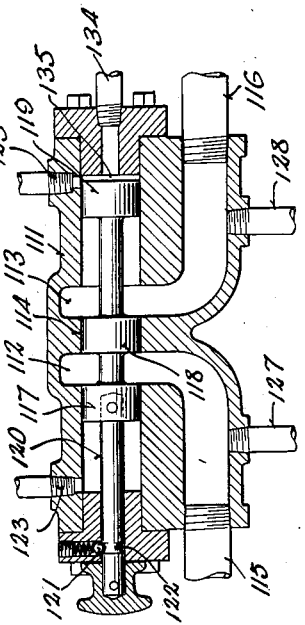
INVENTOR.
WALTER FERRIS
BY Ralph W. Brown
ATTORNEY.

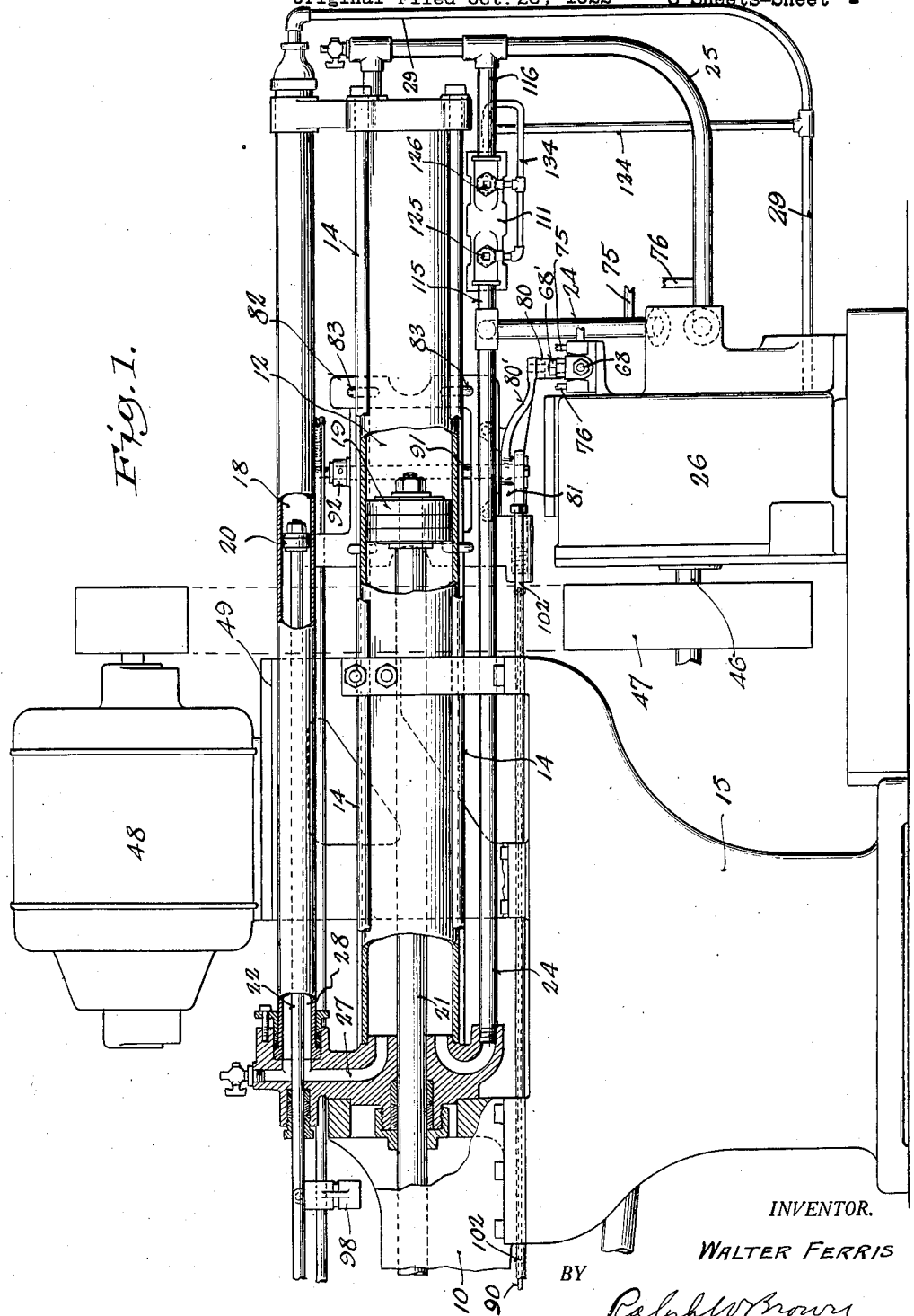

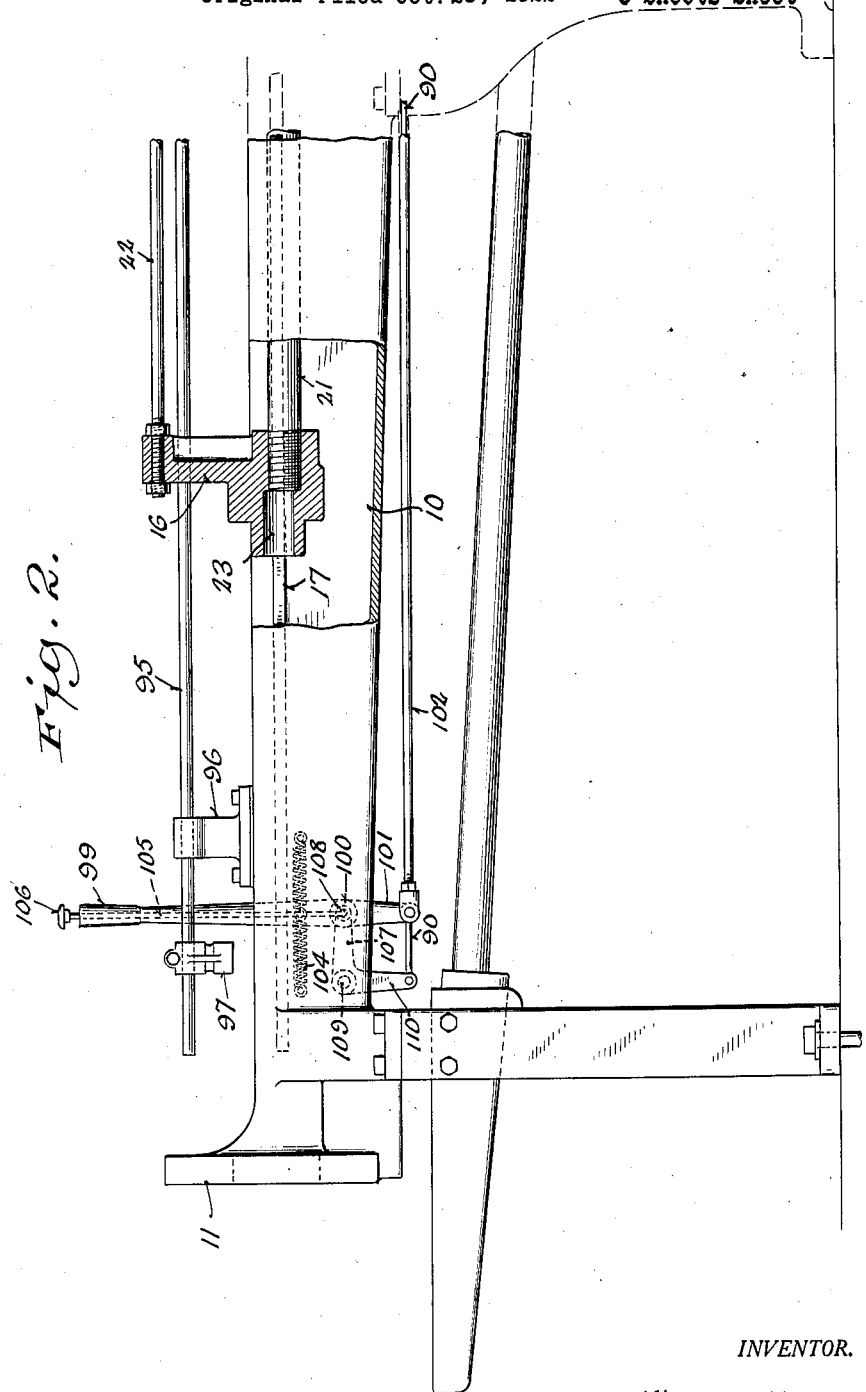

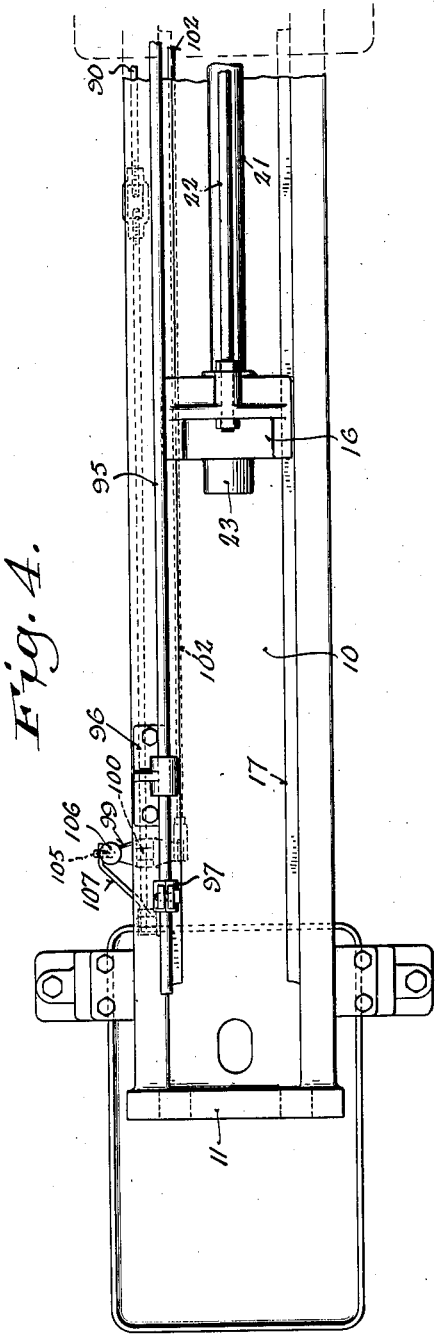
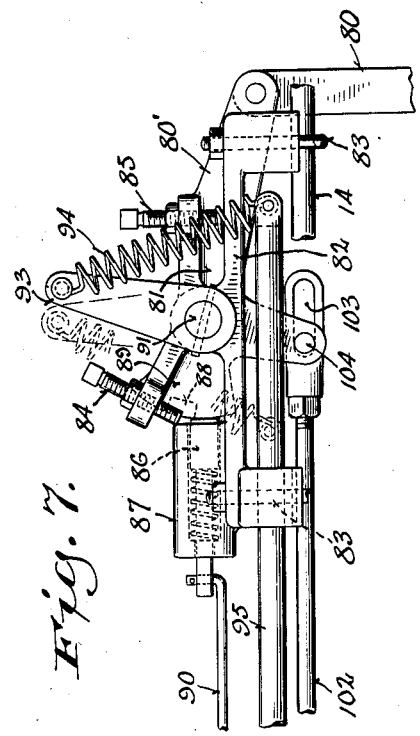

Nov. 1, 1927.

W. FERRIS 1,647,690

HYDRAULIC TRANSMISSION

Original Filed Oct. 26, 1922   6 Sheets-Sheet 5

INVENTOR.
WALTER FERRIS
BY
Ralph W. Brown,
ATTORNEY.

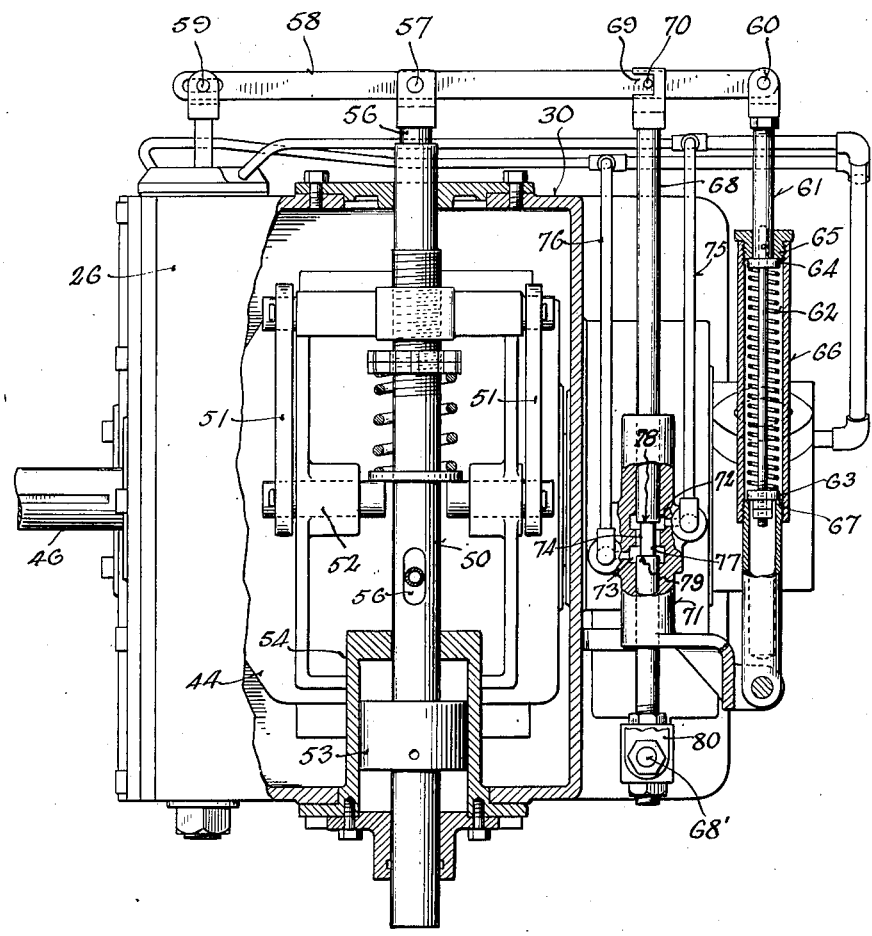

Patented Nov. 1, 1927.

1,647,690

UNITED STATES PATENT OFFICE.

WALTER FERRIS, OF MILWAUKEE, WISCONSIN, ASSIGNOR TO THE OILGEAR COMPANY, OF MILWAUKEE, WISCONSIN, A CORPORATION OF WISCONSIN.

HYDRAULIC TRANSMISSION.

Original application filed October 26, 1922, Serial No. 596,967. Divided and this application filed September 17, 1923. Serial No. 663,215.

This invention relates to hydraulic transmission mechanisms for use, primarily, with machine tools and the like, although certain novel features thereof may be advantageously employed in other relations.

One object of the present invention is the provision of novel means whereby the hydraulic transmission may be placed under the control of the part driven thereby.
Means of the character referred to may be used to particular advantage in machine tools and the like, wherein it is desirable for the tool or other driven part to automatically perform a predetermined cycle or move a predetermined distance and then come to rest.

Some difficulty has been experienced in the application of hydraulic transmissions to some types of machines because of the tendency of the driven part to creep in one direction or another when the pump is supposedly set at zero stroke. This results from the fact that in ordinary practice it is extremely difficult to set the pump at zero stroke with the extreme accuracy required. Another object of the present invention is to overcome this difficulty, and to this end provision is made to automatically short circuit the high and low pressure sides of the transmission system when the pump control mechanism is in zero stroke position.

Another object is the provision of improved protective devices for hydraulic transmission systems by which undue pressures therein will be avoided.

Another object is the provision of improved control mechanism for hydraulic transmission systems.

Other objects and advantages will hereinafter appear.

This application is a division of my copending application, Serial No. 596,967, filed October 26, 1922, which has matured into Patent No. 1,468,595, issued the 18th day of September, 1923. Although the hydraulic transmission mechanism is well adapted for and is herein shown applied to a broaching machine, it will be understood that it is also well adapted for various other uses.
The figures of the drawings are as follows:

Figure 1 is a side elevation, partly in section, of a portion of a broaching machine having applied thereto a hydraulic transmission constructed in accordance with the present invention.

Figure 2 is a side elevation, partly in section, of the remainder of the machine.

Figure 3 is a plan view of that portion of the machine illustrated in Figure 1.

Figure 4 is a plan view of that portion of the machine illustrated in Figure 2.

Figure 7 is a detail of a portion of the control mechanism.

Figure 8 is a fragmentary plan view of the pump casing illustrating the application of another portion of the control mechanism thereto.

Figure 9 is a sectional view of a high pressure relief mechanism employed for protecting the hydraulic system.

Figure 10 is a sectional view of a relief valve constituting a part of the relief mechanism.

Figure 5:
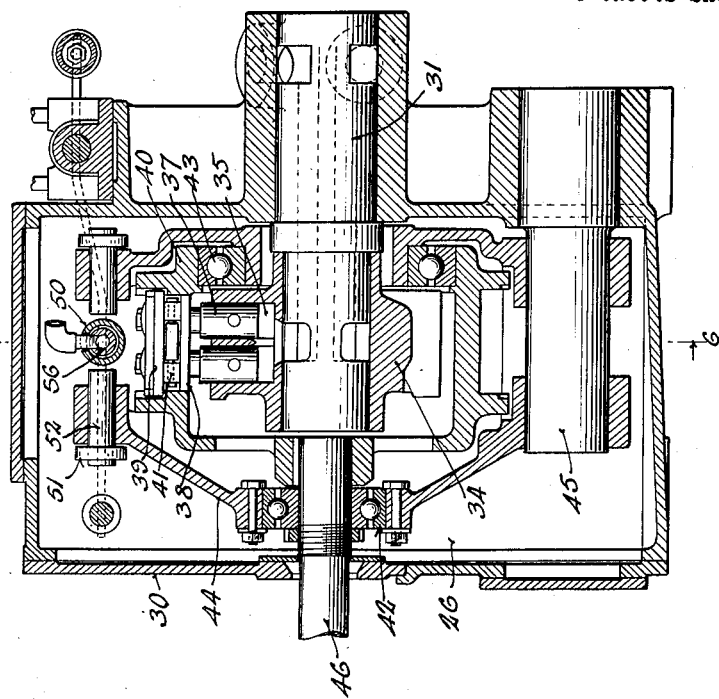
Figure 5 is an axial sectional view of a variable displacement pump constituting a part of the hydraulic transmission.

The broaching machine selected for illustration comprises a bed or trough 10 of well known form provided at one end with the usual face plate 11 through which the broaching tool travels during its working and return strokes. A working cylinder 12 is arranged at the other end of the trough and extends substantially in alignment therewith. This cylinder is preferably securely united with the trough through four heavy tension rods 14, so that the two together form a substantially rigid structure supported intermediate its ends upon a heavy pedestal 15.

A tool actuating cross-head 16 is mounted for reciprocation in the usual manner between a pair of guides 17 extending within and longitudinally of the trough 10. The cross-head 16 is actuated by an appropriate hydraulic motor which, in this instance, comprises the main cylinder 12 hereinabove mentioned and an auxiliary cylinder 18. A piston 19 reciprocable in the main cylinder 12 and a piston 20 in the auxiliary cylinder 18 are both connected with the cross-head 16 through their respective piston rods 21 and 22. The main piston rod 21 is connected with the cross-head just below the usual tool receiving socket 23 and the auxiliary rod 22 above the socket at a somewhat greater distance therefrom. In fact, the distance of each piston rod from the socket is preferably inversely proportional to the effective pull of the respective rods, so that there is no tendency for the cross-head to rock or bind upon its guides as the broaching tool is being pulled through the work.

The opposite ends of the cylinder 12 are in direct communication, through pipes 24 and 25, respectively, with the two sides of the hydraulic circuit established by the pump 26, a port 27 effecting communication between one end of the cylinder 12 and the corresponding end 28 of the cylinder 18. The volumetric capacity of the end 28 of cylinder 18 is preferably substantially equal to the volumetric displacement of the piston rod 21 within the cylinder 12, so that the rate of flow of the liquid in the one pipe 24 is always equal to that in the other pipe 25. In other words, as the pistons 19 and 20 move simultaneously toward the right, the volume of liquid discharged from the right end of cylinder 12 is equal to the total volume of liquid admitted to the left ends of cylinders 12 and 18. The same volumetric relation exists when the pistons 19 and 20 move toward the left. Thus, it will be noted that the volumetric capacity of the entire hydraulic system remains constant notwithstanding the differential capacities of the two ends of the cylinder 12 resulting from the displacement of the piston rod 21. The inactive end of the auxiliary cylinder 18 communicates through a pipe 29 with the base of the pump casing into which any leakage past the piston 18 may be discharged.

The machine illustrated is of that type in which the broaching tool is pulled through the work, so that to perform a working stroke liquid is delivered into the left ends of the cylinders 12 and 18 through the pipe 24 and to effect a return stroke liquid is forced into the right end of the cylinder 12 through the pipe 25. To obtain a steady advance of the tool it is essential that the driving liquid be supplied at a steady rate rather than under a constant pressure. This is accomplished in this instance by directly connecting to the pipes 24 and 25 a pump 26, capable of delivering a steady flow of liquid to either in accordance with the direction of the stroke desired. The pump 26 herein employed is a reversible, constant speed, variable displacement pump of the type fully described in my copending application Serial No. 483,468, filed July 9, 1921.

Figure 6:
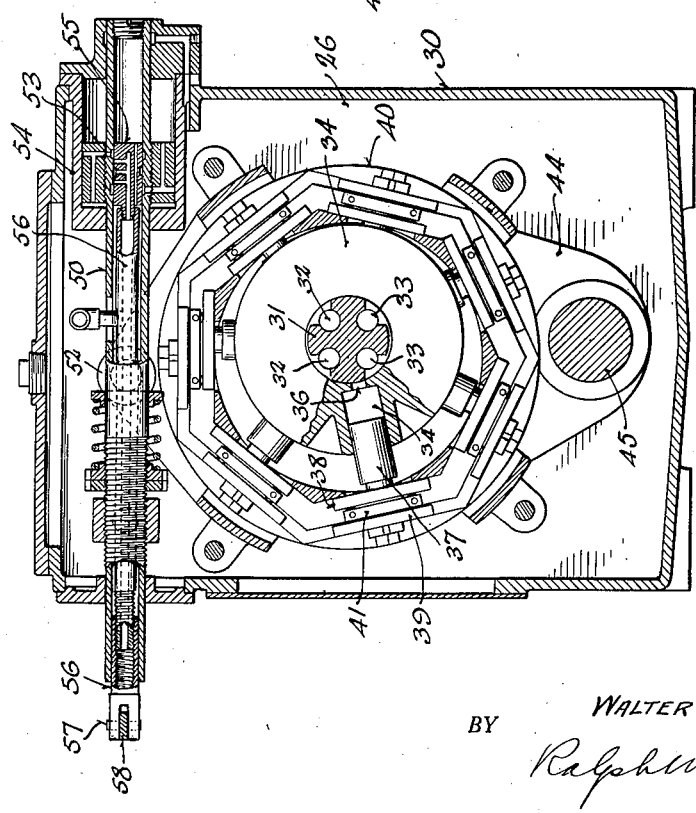
Figure 6 is a sectional view taken substantially on the line 6—6 of Figure 5.

This pump, as shown in Figures 5 and 6, comprises a casing 30 having a pintle 31 rigidly secured therein. The pintle contains two pairs of ducts 32 and 33, one pair 32 communicating with the pipe 24, the other pair with the pipe 25. A cylinder barrel 34, mounted for rotation upon the pintle 31, is provided with a series of cylinders 35 arranged in pairs and radially disposed with respect to the center of rotation. Each cylinder has a port 36 which is brought into communication with one or the other pair of ducts 32 and 33 during rotation of the cylinder barrel. A piston 37 is mounted for reciprocation in each cylinder, each pair of pistons being integrally connected with a cross-head 38 which bears against a reaction plate 39 removably secured in the periphery of a rotatable impelling ring 40. Appropriate anti-friction means 41 is interposed between each cross-head 38 and its corresponding reaction plate 39 in order to permit free lateral movement therebetween.

The impelling ring 40 is journaled in bearings 42 and 43 in a cradle 44 mounted to rock about a pintle 45 secured within the lower part of the casing 30 below the pintle 31. Rotation of the impelling ring 40 is effected through a drive shaft 46 keyed thereto and extending outside of the pump casing. In this instance, the free end of the shaft 46 is shown provided with a pulley 47 through which it is driven from a constant speed motor 48, mounted upon a bracket 49 carried by the pedestal 15. This pump is fully described in the copending application hereinabove last referred to so that a further detailed description thereof is deemed unnecessary. Suffice it to say that when the cradle 44 is in an intermediate position so that the impelling ring is concentric with the pintle 31, rotation of the impelling ring will cause the pistons 37 to travel about the pintle 31 without reciprocation within their respective cylinders 35. In this position, no liquid is delivered by the pump. By rocking the cradle in one direction or another from a neutral position, the impelling ring will be made to assume an eccentric position and by its rotation cause a reciprocation of the pistons within their cylinders, thus causing the pump to produce a steady flow of liquid in opposite directions through the pairs of ducts 32 and 33 at a rate and in a direction dependent upon the extent and direction of eccentricity of the impelling ring.

The cradle 44 is actuated and controlled by mechanism of the type disclosed in the copending application last above identified. This mechanism includes a plunger 50 connected through links 51 with the upper end of the cradle 44, as indicated at 52. The plunger 50 is actuated by a piston 53 mounted in a cylinder 54 within the pump casing. Movement of the piston 53 is controlled by a pilot valve 55 reciprocally mounted within the plunger 50, and provided with a valve stem 56 extending longitudinally of and beyond the plunger. The arrangement is such that when the pilot valve 55 is shifted in either direction, fluid pressure is applied to one or the other side of the piston 53 to cause the plunger 50 and cradle 44 to shift in a corresponding direction to an extent dependent upon the extent of movement of the pilot valve.

The exposed end of the stem 56 of the pilot valve is operatively connected, as at 57, with a lever 58 mounted to rock about a fulcrum 59 at one end thereof. The other end of the lever is pivotally connected at 60 with a centering plunger 61, which tends at all times to maintain the lever 58 in a neutral position, that is, in such position that the stem 56, plunger 50 and cradle 44 are in a neutral position and the impelling ring consequently in concentric relation to the pintle 31. This is accomplished by the use of a coiled spring 62 which normally bears at its opposite ends against collars 53 and 64 on the plunger 61, and which is confined between one end 65 of a cylinder 66 and a shoulder 67 therein. The plunger 61 is thus yieldably retained in an intermediate position but is shiftable in either direction against the pressure of the spring.

The lever 58 is shiftable in either direction from the neutral position by a plunger 68 actuated by mechanism to be hereinafter described. This plunger 68 is slotted or notched, as indicated at 69, to loosely embrace a pin 70 secured to the lever 58. This plunger is mounted for reciprocation in a valve chest 71 having two chambers 72 and 73 normally in communication through a port 74. Chamber 72 is connected through a pipe 75 with the pipe 24 constituting one side of the hydraulic circuit and chamber 73 is connected through a pipe 76 with the pipe 25 constituting the other side of the circuit. The plunger 68 is provided with a reduced portion 77 of smaller diameter than the port 74 and so arranged as to permit a free flow of liquid between the chambers 72 and 73 when the plunger 68 is in neutral position. Thus, when the parts of the pump and pump control mechanisms are substantially in neutral position, the port 74 constitutes a by-pass between the two sides of the circuit to insure against a building up of pressure in the system which might otherwise result, due to a minute eccentricity of the impelling ring. As the plunger 68 is shifted in either direction, however, one of the shoulders 78 or 79 thereof enters the port 74 and shuts off communication between the chambers 72 and 73 and the by-pass is destroyed. The loose play between the notch 69 of the plunger 68 and the pin 70 on the lever 58 is preferably such as to permit the shifting of the plunger 68 into port closing position before the lever 58 is shifted from neutral position. Further movement of the plunger 68 then causes a corresponding shifting of the lever 58 to the extent desired.

In the machine shown, the plunger 68 is connected at 68' with a link 80 connected with and actuated by an arm 80' constituting a part of a pivoted bracket 81 mounted upon a fixed bracket 82 so as to rock about a substantially vertical axis. Bracket 82 is secured by U-bolts 83 to a pair of tension rods 14 hereinabove referred to. Adjustable set screws 84 and 85 carried by the pivoted bracket 81 limit the rocking movement of this bracket by their engagement with the vertical face of the fixed bracket 82. By an adjustment of either of these set screws the extent of movement of the bracket 81, and consequently the link 80, in either direction, is nicely controlled. A spring pressed latch pin 86, reciprocally mounted in a hollow lug 87 on the fixed bracket 82, is adapted to releasably retain the pivoted bracket 81 and consequently the link 80 in an intermediate or neutral position, by its engagement in a socket 88 formed in a sector 89 constituting a part of the pivoted bracket. The pin 86 may be withdrawn from latching position through a link 90 by mechanism to be later described.

The pivoted bracket 81 is secured to a vertical shaft 91 journaled in bearings 92 in the fixed brackets, and provided at its upper end with an arm 93 fixed thereto. Arm 93 is connected through a spring 94 with a detent rod 95, mounted for longitudinal reciprocation in guide brackets 96 fixed to one side of the trough 10 of the machine. A pair of lugs 97 and 98, adjustably fixed to the rod 95, project into the path of movement of the tool actuating cross-head 16, and, through the rod 95, serve to automatically limit the extent of movement of the cross-head in a manner to be now explained.

Assume that the parts are in the position shown in Figures 3 and 4 with the detent rod 95 in its right hand limiting position so that the spring 94 tends to swing the arm 93 toward the right. The pivoted bracket is retained in its neutral intermediate position by the latch pin 86. To initiate the movement of the cross-head 16 the latch pin 86 is withdrawn by pulling the link 90. As soon as released the pivoted bracket 81 is rocked in a clockwise direction, by the tension of the spring 94 upon the arm 93, into its limiting position as determined by the setting of the screw 85. This results in the shifting of the link 80 and plunger 68 in such direction as to cause the pump 26 to deliver liquid through the pipe 25 to the right end of cylinder 12. This causes an advance of the piston 19 and cross-head 16 to the left. This movement of the cross-head continues until the detent rod 95 has been shifted toward the left, by the engagement of the cross-head with the lug 97, and the spring 94 has been correspondingly shifted to cause the arm 93 to swing toward the left. This obviously causes the pivoted bracket 81 to rock in a counter-clockwise direction until the socket 88 thereof is reengaged by the latch pin 85. The pivoted bracket, and consequently the link 80 and plunger 68, have thus been returned to the neutral position in which no liquid is delivered by the pump. The cross-head 16 discontinues its advance and remains at this condition of rest until the latch pin 86 has again been released by pulling the link 90.

Movement of the cross-head 16 in the other direction is accomplished in a similar manner by withdrawing the latch pin 86. The detent rod 95 is, of course, in its extreme left hand position, so that the spring 94 is in such position as to pull the arm 93 toward the left when the socket 88 in the pivoted bracket is released. This results in a rocking of the pivoted bracket in a counter-clockwise direction, to a limiting position as determined by the screw 84, and a corresponding shifting of the link 80 and plunger 68 so as to cause the pump to deliver liquid through the pipe 24. As the liquid is forced into the left ends of cylinders 12 and 18, the pistons 19 and 21, and consequently the cross-head 16, advance toward the right until the detent rod 95 has been returned approximately to the position of Figure 3 by the engagement of the cross-head with the lug 98. When this occurs, the spring 94 is again in such position as to swing the arm 93 and the pivoted bracket in a clockwise direction until restrained by the latch pin in the neutral position. The pump is thus returned to neutral and the cross-head brought to rest, in which condition it remains until the pin is again withdrawn.

Thus, it will be noted that in the machine illustrated, mechanism is provided for automatically limiting the extent of movement of the cross-head and tool and for retaining the cross-head at rest at either end of its stroke. This allows the operator ample time in which to remove or replace the tool or the work at either end of the stroke. It will be further noted that the extent of movement of the pivoted bracket, link 80 and plunger 68 in either direction is adjustable so that the pump displacement and consequently the rate of travel of the cross-head in either direction may be varied to meet the conditions required. Thus the return stroke of the cross-head may be at a higher rate of travel than the working stroke with a consequent saving of time between working strokes.

Mechanism is also preferably provided by which the operator may interrupt or reverse the direction of travel of the cross-head at any point desired. In the machine shown, this mechanism comprises a hand lever 99 conveniently mounted upon a fixed pivot 100 at the side of the trough 10. A depending arm 101, fixed to the hand lever 99, is connected to one end of a link 102 which extends longitudinally of the machine and provided at its other end with a slot 103 embracing a stud 104 carried by the pivoted bracket 81. The slot 103 permits the above described automatic rocking of the bracket 81 without disturbing the position of the lever 99 or link 102 when these parts are in the intermediate position normally maintained by a pair of tension springs 104 fixed to the machine frame and to the opposite sides of lever 99.

A control rod 105 having a convenient button 106 is mounted upon the lever 99 for reciprocation lengthwise thereof. This rod is connected with one arm 107 of a bellcrank at a point 108 substantially concentric with the rocking axis of the lever. The bellcrank is mounted to rock about a pivot 109 fixed to the machine and its other arm 110 is connected with the link 90 above referred to. The arrangement is such that when the control rod 105 is depressed, the bellcrank is rocked in such direction as to shift the link 90 and thus release the pivoted bracket 81 so as to start the cross-head on its working or return strokes in the manner above described.

To arrest the movement of the cross-head it is only necessary to rock the hand lever 99 into such position as to shift the pivoted bracket 81 into neutral position by the action of the link 102. The bracket 81 will normally be retained in this position by the latch pin 86 and the cross-head will come to and remain at rest. To effect reversal of the cross-head at any point in its travel, the control rod 105 is depressed and retained in a depressed condition by the thumb of the operator and the hand lever is shifted sufficiently to reverse the position of the pivoted bracket 81. Upon release of the hand lever and control rod, the pivoted bracket will automatically return to its neutral position under the action of spring 94 and the cross-head will come to rest.

Provision is also preferably made for guarding against undue pressure in the hydraulic circuit to thus avoid injury to the tool or machine parts. In the machine shown, this is accomplished by the use of a hydraulic circuit breaker by which a by-pass may be automatically established between the two sides of the circuit by pressures exceeding a predetermined limit. The circuit breaker shown comprises a valve chest 111 having chambers 112 and 113 therein and a port 114 therebetween. Chamber 112 communicates with pipe 24 through a pipe 115 while chamber 113 communicates with pipe 25 through a pipe 116. A balanced piston valve having three piston heads 117, 118 and 119 is reciprocally mounted within the valve chest. In its normal position, the piston head 118 is in the position shown within and closing the port 114 between the chambers. The three piston heads are of the same diameter so that differences in pressure within the two chambers 112 and 113 will not affect the normal position of the piston. One end of this piston is provided with a stem 120 extending through the end wall of the valve chest by which the piston may be manually manipulated. A spring pressed latch 121, engageable in a groove 122 in the stem 120, tends to maintain the piston in normal position. The opposite ends of the valve chest are provided with bleeds 123 through which any accumulation of liquid therein may drain off slowly through a discharge pipe 124 to the base of the pump casing.

Pressure relief valves 125 and 126 communicate with the pipes 115 and 116, respectively, through pipes 127 and 128. Each relief valve comprises a spring loaded valve 129 mounted in a chamber 130 and cooperating with a valve seat 131 to normally prevent a flow of liquid from the pipe 127 or 128 into the chamber 130. The tension in each spring 132 may be varied and controlled by the usual pressure screw 133. The chambers 130 of the relief valves communicate through a pipe 134 with an end 135 of the valve chest 111.

The arrangement is such that when the pressure in either side of the hydraulic circuit, that is, in either of the pipes 24 or 25, exceeds a predetermined limit, the corresponding relief valve 125 or 126 is opened and the fluid is forced through pipe 134 into the end 135 of the valve chest. Pressure is thus established behind the piston head 119 causing the piston to move to the left until the piston head 118 has moved out of the port 114 and communication has been established therethrough between the chambers 112 and 113. The two sides of the circuit are thus promptly by-passed and the pressure in the high pressure side destroyed. This obviously brings the cross-head 16 to rest. This by-pass remains open until the piston has been returned to its normal position by manipulating the stem 120, so that the cross-head remains at rest until the operator has corrected the trouble and forced the stem 120 home.

Various changes may be made in the illustrative embodiment of the invention hereinabove described, without departing from or sacrificing any of the advantages of the invention as defined in the appended claims.

I claim:

1. The combination of a driven member, hydraulic means including a reversible flow variable displacement pump for driving said member, means for regulating pump displacement, a spring connected at one end to said regulating means and operable thereon to reverse the flow of said pump, and means controlled by movement of said member for shifting the other end of said spring into either of two operating positions.

2. The combination of a driven member, hydraulic means including a reversible flow, variable displacement pump for driving said member, means for regulating pump displacement, adjustable means for regulating the extent of movement of said regulating means, a spring connected at one end to said regulating means and operable thereon to reverse the flow of said pump in either direction, and means controlled by movement of said member for shifting the other end of said spring into either of two operating positions.

3. The combination of a driven member, hydraulic means including a reversible flow, variable displacement pump for driving said member, means for regulating pump displacement, a spring connected at one end to said regulating means and operable thereon to reverse the flow of said pump, means controlled by movement of said member for shifting the other end of said spring into either of two positions of operation, mechanism automatically operable to interrupt the action of said regulating means, and means for releasing said mechanism to complete the action of said regulating means.

4. The combination of a driven member, hydraulic means including a reversible flow, variable displacement pump for driving said member, means for regulating pump displacement, a spring operable to shift said regulating means from one extreme position to another to reverse said pump, and mechanism operable to interrupt the action of said regulating means, and means for releasing said mechanism to complete the action of said regulating means.

5. In a hydraulic transmission for machine tools and the like, the combination of a variable displacement pump, a hydraulic circuit fed thereby, means for varying and controlling pump displacement, and means including a valve associated with said means for placing the opposite sides of said circuit in communication when said pump displacement is substantially zero.

6. In a hydraulic transmission the combination of a variable displacement pump, a hydraulic motor, a fluid circuit connecting pump and motor, means for varying and controlling pump displacement, and means associated with said last named means for short circuiting said circuit when said pump displacement is substantially zero.

7. In a hydraulic transmission the combination of a variable stroke pump, a hydraulic motor, a fluid circuit connecting pump and motor, short circuiting means therefor, means for controlling the pump stroke, and means for opening said short circuiting means when said control means is set at zero pump stroke and for closing said short circuiting means when said control means is shifted from zero pump stroke.

8. In a hydraulic transmission the combination of a variable stroke pump, a hydraulic motor, a fluid circuit connecting pump and motor, short circuiting means therefor, means for controlling pump stroke, means for yieldably maintaining said short circuiting means effective, and means for rendering said short circuiting means ineffective when said control means is shifted from zero stroke position.

9. In a hydraulic transmission the combination of a pump and motor, a fluid circuit connecting them, short circuiting means therefor, means controlled by the pressure in said circuit for rendering said short circuiting means effective, and manual means for rendering said short circuiting means ineffective.

10. In a hydraulic transmission the combination of a pump and motor, a fluid circuit connecting them, a valve controlled by the pressure of fluid in said circuit for relieving the pressure therein, and manual means for resetting said valve.

11. In a hydraulic system the combination of a pressure conduit, a valve chest having a chamber communicating with said conduit and an exhaust passage, a valve normally closing said passage, a pressure relief valve associated with said conduit, and means for delivering the fluid which passes said relief valve into said valve chest to shift said first named valve and open said passage.

12. In a hydraulic system the combination of a fluid circuit having high and low pressure sides, means including a valve for opening communication between said sides, and means including a pressure controlled valve associated with said high pressure side for applying fluid pressure to said first named valve to open said communication.

13. In a hydraulic transmission the combination of a work circuit, means for forcing fluid through said circuit in either direction, a valve chest having a port adapted to communicate with both sides of said circuit to break the circuit, a member normally closing said port, a pressure controlled means associated with each side of said circuit, and means associated with said pressure controlled means through which fluid pressure is applied to said member to open said port when the pressure in either side of the circuit exceeds a predetermined degree.

In witness whereof, I hereunto subscribe my name this 15th day of September, 1923.

WALTER FERRIS.